United States Patent
Qian et al.

(10) Patent No.: US 10,761,694 B2
(45) Date of Patent: Sep. 1, 2020

(54) EXTENDED REALITY CONTENT EXCLUSION

(71) Applicant: Lenovo (Singapore) Pte. Ltd., Singapore (SG)

(72) Inventors: Ming Qian, Cary, NC (US); Song Wang, Cary, NC (US); Jian Li, Chapel Hill, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/217,991

(22) Filed: Dec. 12, 2018

(65) Prior Publication Data
US 2020/0193715 A1   Jun. 18, 2020

(51) Int. Cl.
| G06F 3/0484 | (2013.01) |
| G06T 19/20 | (2011.01) |
| G06K 9/00 | (2006.01) |
| G06T 19/00 | (2011.01) |
| H04N 21/234 | (2011.01) |
| H04N 21/472 | (2011.01) |
| G06T 11/60 | (2006.01) |

(52) U.S. Cl.
CPC ....... *G06F 3/0484* (2013.01); *G06K 9/00671* (2013.01); *G06T 11/60* (2013.01); *G06T 19/006* (2013.01); *G06T 19/20* (2013.01); *H04N 21/23412* (2013.01); *H04N 21/47205* (2013.01); *H04N 2201/3256* (2013.01)

(58) Field of Classification Search
None
See application file for complete search history.

(56) References Cited

U.S. PATENT DOCUMENTS

| 2017/0123750 A1* | 5/2017 | Todasco | G06F 3/1454 |
| 2017/0301147 A1* | 10/2017 | Hurter | G06T 15/08 |
| 2019/0130648 A1* | 5/2019 | Duca | G06T 19/006 |

* cited by examiner

*Primary Examiner* — Jwalant Amin
(74) *Attorney, Agent, or Firm* — Ference & Associates LLC

(57) ABSTRACT

One embodiment provides a method, including: receiving, at information handling device, an indication to display extended reality content in a field of view; identifying, using a processor, at least one portion in the field of view where the extended reality content should not be displayed; and excluding, responsive to the identifying, the extended reality content from being displayed on the at least one portion in the field of view. Other aspects are described and claimed.

14 Claims, 3 Drawing Sheets

EXTENDED REALITY CONTENT EXCLUSION

BACKGROUND

Advances in technology have led to the development of information handling devices ("devices"), for example smart phones, tablet devices, head-mounted wearable headsets, and the like, capable of displaying a variety of different types of extended reality ("XR") content such as augmented reality ("AR") content, mixed reality ("MR") content, virtual reality ("VR") content, a combination thereof, and the like. These XR-enabled devices may provide an overlay of virtual elements onto a live view of a physical, real-world environment. The virtual elements may be spatially registered with the physical world so that the virtual elements may be perceived as an immersive aspect of the physical world.

BRIEF SUMMARY

In summary, one aspect provides a method, comprising: receiving, at information handling device, an indication to display extended reality content in a field of view; identifying, using a processor, at least one portion in the field of view where the extended reality content should not be displayed; and excluding, responsive to the identifying, the extended reality content from being displayed on the at least one portion in the field of view.

Another aspect provides an information handling device, comprising: a processor; a memory device that stores instructions executable by the processor to: receive an indication to display extended reality content in a field of view; identify at least one portion in the field of view where the extended reality content should not be displayed; and exclude, responsive to the identifying, the extended reality content from being displayed on the at least one portion in the field of view.

A further aspect provides a product, comprising: a storage device that stores code, the code being executable by a processor and comprising: code that receives an indication to display extended reality content in a field of view; code that identifies at least one portion in the field of view where the extended reality content should not be displayed; and code that excludes the extended reality content from being displayed on the at least one portion in the field of view.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
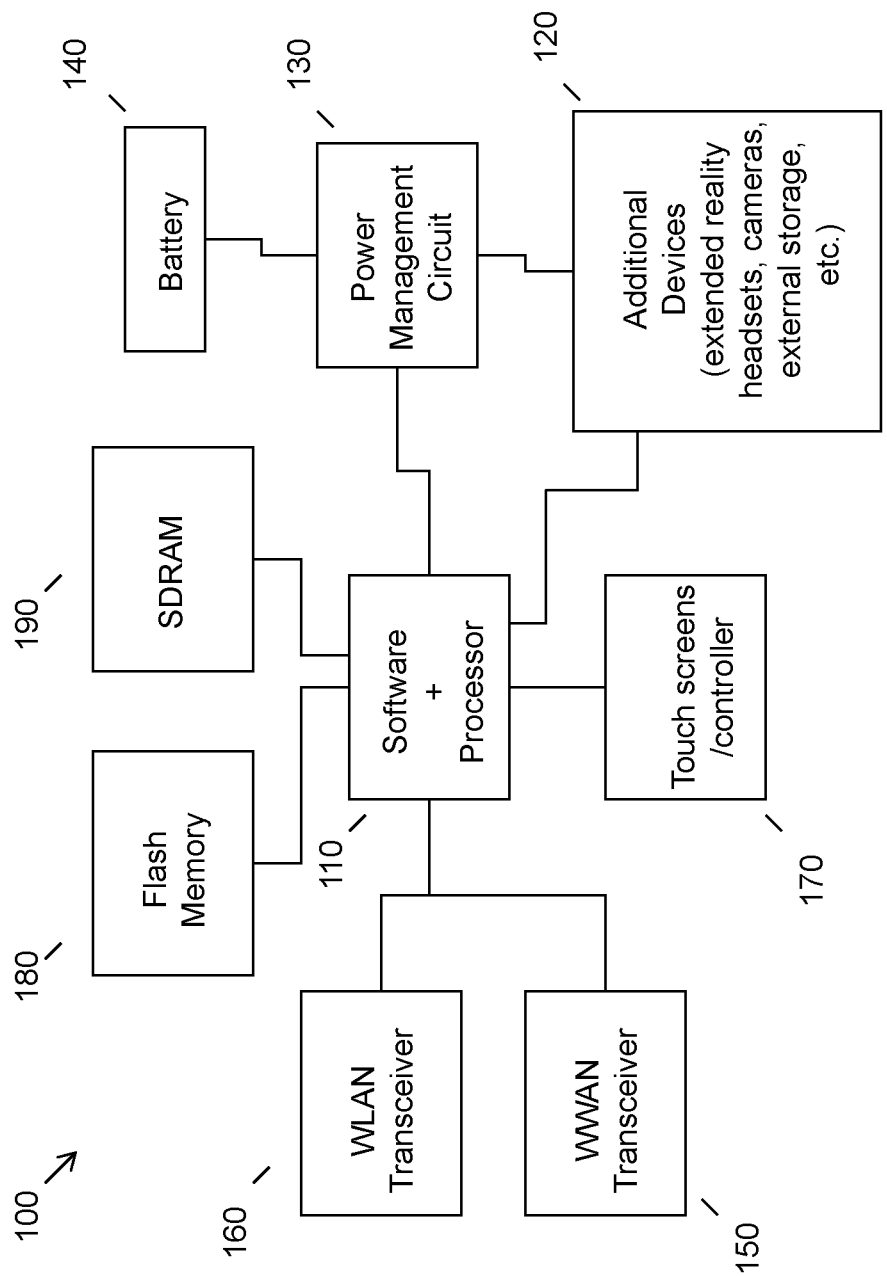
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Using XR-enabled devices, a user may visualize and interact with XR content in new and unique ways. However, in certain situations, the display of XR content may be annoying and/or dangerous to a user. For instance, a user wearing an XR-enabled headset may find that the XR content is projected into a field of view of the user. Depending on the characteristics of the XR content (e.g., size, shape, color, position, etc.), the XR content may interfere with a user's ability to properly function in the real world by obscuring important objects in their field of view. For example, a large application window may be projected in front of a user's face that may obscure one or more objects (e.g., one or more mirrors, individuals, signs, other electronic devices, etc.). In this situation, the user may not be able to obtain any visual information provided by these objects while they are obscured.

Conventionally, users may manually adjust one or more characteristics of the displayed XR content. For instance, a user may reposition or minimize an application, adjust the transparency of an XR object, etc. However, although a user has some level of control over how the XR content is displayed, they may not be able to make adjustments in a timely fashion, especially if their contextual situation changes rapidly. For example, a user operating a vehicle may find it very inconvenient if XR content was displayed overtop certain mirrors (e.g., a rearview mirror, one or both side view mirrors, etc.) or instrument clusters (e.g., speedometers, fuel gauge, navigation screen, etc.) in the vehicle. Although the XR content may be repositioned, a user must temporarily divert their attention from the road to do so. Additionally, the user may miss important information during the time that the vehicular objects are obscured (e.g., speed information, surrounding traffic information, etc.). As such, the provision of adjustment input to reposition XR content is time-consuming, burdensome, and potentially dangerous.

Accordingly, an embodiment provides a method for dynamically preventing content from being displayed on certain objects in a user's field of view. In an embodiment, an indication may be received by a device to display content in a user's field of view. The content may be any type of XR content (e.g., augmented reality content, mixed reality content, virtual reality content, etc.), digital content (e.g., time display, device battery display, etc.), a combination thereof, and the like. An embodiment may determine at least one portion in the field of view where the content should not be displayed. The determination may be conducted, for example, by analyzing the objects present in the user's field of view and determining whether any object is associated with an excluded object (i.e., a known object to not display content on). Responsive to identifying an excluded object in the field of view, an embodiment may exclude content from being displayed on the portion of the field of view associated with the excluded object. For instance, in a non-limiting example use-case, a user that is operating a vehicle while wearing an augmented reality headset may not want any augmented reality content to appear overtop their rearview mirror. If an embodiment detects (e.g., through one or more object detection and/or object recognitions techniques, etc.) a rearview mirror in a user's field of view, an embodiment may prevent any content from being displayed on the headset lens portion that corresponds to the rearview mirror. Such a method may prevent content from being displayed overtop objects or locations that a user deems to be important.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
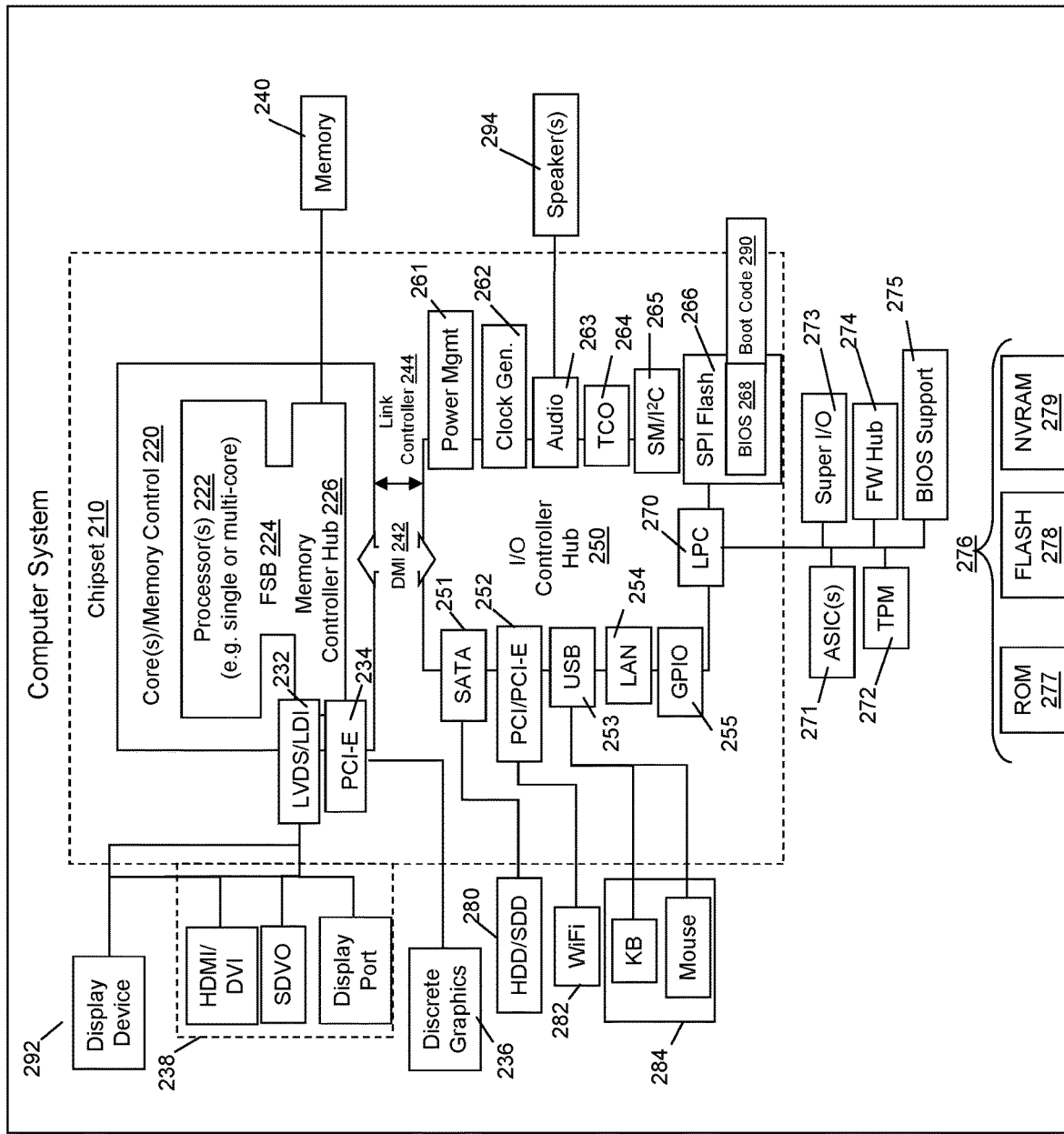
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, extended reality capable headsets, personal computer devices generally, and/or electronic devices that are capable of capturing worldview image data and displaying extended reality content on one or more display screens of the device. For example, the circuitry outlined in FIG. 1 may be implemented in a tablet or smart phone embodiment, whereas the circuitry outlined in FIG. 2 may be implemented in a laptop embodiment.

Figure 3:
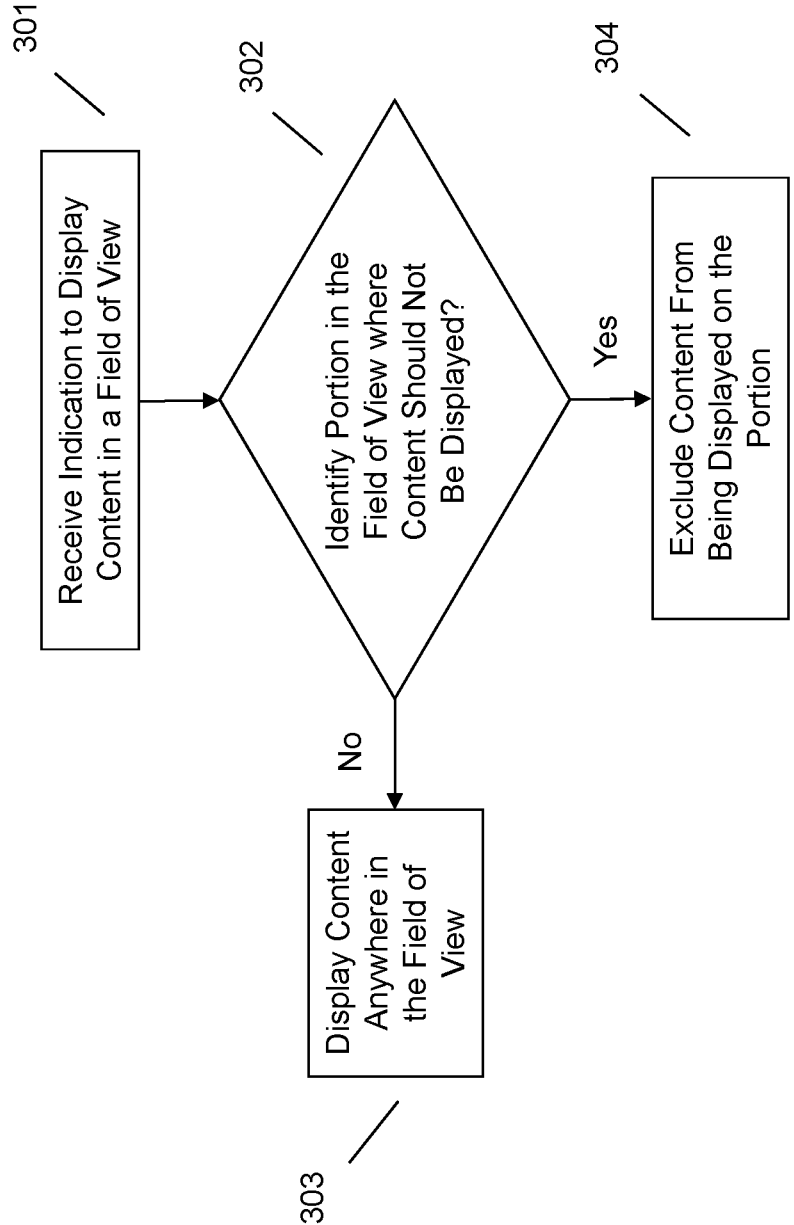
FIG. 3 illustrates an example method of excluding content from select objects in a user's field of view.

Referring now to FIG. 3, an embodiment may automatically exclude content from being displayed overtop certain real-world objects in a user's field of view. At 301, an embodiment may receive an indication to display content in a user's field of view. In the context of this application, content may refer to virtually any type of extended reality content (e.g., augmented reality content, mixed reality content, virtual reality content, etc.), digital content (e.g., time display, device battery display, etc.), a combination thereof, and the like. The content may be displayed on one or more displays of an XR-capable device (e.g., a smart phone or tablet capable of displaying XR content on a display screen of a device, a wearable XR-headset capable of displaying content on a transparent, or semi-transparent, visor or display lens of the headset, etc.). In the context of this application, the user's field of view may correspond to the observable area a user may be able to see through their eyes or through a transparent, or semi-transparent, screen associated with a device (e.g., a lens or visor of an XR-headset, etc.). Additionally or alternatively, the user's field of view may correspond to the static or dynamic images captured by an optical device (e.g., a camera, etc.) and provided to the user on a display screen of the device (e.g., a smart phone, a tablet, etc.). For simplicity purposes, the majority of the discussion herein will involve AR content displayed on an AR headset. However, it should be understood that such a generalization is not limiting and any XR-capable device may be utilized to execute the processes of the underlying application.

In an embodiment, the indication may be associated with a user-provided command to display content. For example, a user may provide a gesture command to activate an AR-application (e.g., an AR-based word processing application, an AR-based internet browsing application, etc.). Alternatively, in another embodiment, the indication may be associated with the detection and/or recognition of certain types of context data captured by one or more sensors (e.g., cameras, microphones, etc.) associated with the device. For example, responsive to detecting or recognizing a road sign (e.g., speed limit sign, stop sign, etc.), an embodiment may automatically display an AR representation of that sign to a user (e.g., a notification that the sign has been detected, an image of that sign, etc.). As another example, responsive to detecting or recognizing that the ambient light levels in a user's environment have decreased below a predetermined threshold, an embodiment may automatically activate a night vision filter.

At 302, an embodiment may identify at least one portion in the user's field of view where content should not be displayed. In an embodiment, the identification of this portion may be conducted prior to the actual display of the content in the user's field of view. In an embodiment, the identification may be conducted by first identifying an object in the field of view and thereafter determining whether the object is associated with an excluded object. In the context of this application, an excluded object may refer to an object that content should not be displayed on or over. An excluded object stands in contrast to an included object, which, in the context of this application, may refer to an object that content may be displayed on or over. In the context of this application, the display of content "on or over" an object may refer to the display of content on a portion of a display screen of the device that corresponds to the object location. In an embodiment, the identification and/or recognition of an object may be accomplished by using one or more conventional image analysis techniques. For example, an embodiment may first capture (e.g., using one or more camera sensors, etc.) a worldview image corresponding to a user's field of view. An embodiment may thereafter access a database comprising a plurality of stored objects and thereafter determine whether any of those stored objects are present in the user's field of view.

Responsive to identifying one or more objects in the user's field of view, an embodiment may compare the identified object to a stored list of objects (e.g., stored in a local or remote accessible database, etc.) to determine whether the identified object is associated with an excluded object or an included object. In an embodiment, each object in the stored list may comprise a designation as either being associated with an excluded object or an included object. In an embodiment, the designations may be instituted by a manufacturer of the system and/or may be created and adjusted by a user. In an embodiment, the designations may be dynamically changed/updated responsive to the receipt of certain types of context data. For example, a user driving a vehicle may not want any type of content to be displayed overtop any of their mirrors (e.g., rearview mirror, side mirrors, etc.). However, a user may not mind if content is displayed overtop their mirrors when the vehicle is parked, or not in motion. Therefore, an embodiment may receive context data from various sources to determine if the vehicle is in motion (e.g., GPS movement data from one or more devices, etc.) and may thereafter adjust the designations of the mirror objects based upon this received data (e.g., designate the mirrors as excluded objects when the vehicle is in motion and change this designation to included objects when the vehicle is not in motion, etc.).

An embodiment may conclude whether an identified object is an excluded object or an included object by determining whether the identified object matches an object in the list. In an embodiment, a "match" may be identified if an identified object shares a predetermined level of similarity with an object in the list. For example, in an embodiment, if an identified object shares a predetermined level of physical similarity (e.g., greater than 50% similarity, greater than 75% similarity, etc.) to an object in the list, an embodiment may conclude that the two objects are a match. Alternatively, as another example, two objects may be identified as being a match if they are of the same type, even though they may not physically similar. For example, an identified object and an object in the stored list may be physically dissimilar but may be identified as being the same thing because they perform the same function, serve the same purpose, etc.

Responsive to identifying, at 302, a portion in the user's field of view where content should not be displayed, an embodiment may exclude, at 304, displaying content on or over that portion. For example, responsive to identifying that an identified object is associated with an excluded object in the stored list, an embodiment may not display content on or over the identified object. Alternatively, if content is already being displayed on or over an included object and the designation for that object changes to an excluded object, an embodiment may then dynamically remove that content from a user's field of view, reposition that content to another location that is not associated with an excluded object, increase the transparency of the content so that the object is visible to the user, etc. In the same vein, if content is being displayed in a user's field of view and the user's field of view changes to include an excluded object where the content was previously being displayed, an embodiment may then remove or reposition the content from the portion of the user's field of view associated with the newly identified excluded object. For example, if a user has an AR-infrared screen active on their headset and turns their head to face and talk to another individual, an embodiment may remove the AR-infrared screen over the portion of the user's field of view occupied by the other individual.

Contrary to the foregoing, responsive to identifying, at 302, that there is no portion in the user's field of view where content cannot be displayed, an embodiment may display, at 303, content in any portion of the user's field of view.

The various embodiments described herein thus represent a technical improvement to conventional content exclusion techniques. Using the techniques described herein, an embodiment may receive an indication to display extended reality content in a user's field of view. In an embodiment, at least one portion in the user's field of view may be identified as being associated with a portion that extended reality content should not be displayed on or over. The at least one portion may correspond to an object in the user's field of view. Responsive to identifying a portion on which content should not be displayed on or over, an embodiment may then dynamically exclude the extended reality content from being displayed on or over that portion. Such a method may prevent content from being displayed on or over portions of a user's field of view that a user deems are important. Additionally, such a method eliminates the need for a user to provide manual adjustment input to remove or reposition content that has already been displayed over objects that they deem to be important.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an information handling device operating within a vehicle, an indication to display extended reality content in a field of view;
    identifying, using a processor, whether at least one portion exists in the field of view where the extended reality content should not be displayed, wherein the identifying comprises:
        determining a moving context associated with the vehicle;
        identifying a real-world object present in the at least one portion;
        accessing a database comprising a stored list of real-world objects, wherein each real-world object in the stored list contains a designation as being one of an excluded object or an included object, wherein the designation is influenced by the moving context; and designating, based on the moving context and upon comparison of the identified real-world object to the accessed database, the real-world object as an excluded object or an included object; and excluding, responsive to identifying that the real-world object is designated as an excluded object, the extended reality content from being displayed on the at least one portion in the field of view.

2. The method of claim 1, wherein the extended reality content comprises content selected from the group consisting of augmented reality content, mixed reality content, and virtual reality content.

3. The method of claim 1, wherein the information handling device is associated with at least one of: a head-mounted wearable device and a hand-held smart device.

4. The method of claim 1, wherein the indication is associated with at least one of: a user command and a context detection.

5. The method of claim 1, wherein the identifying comprises identifying prior to displaying the extended reality content.

6. The method of claim 1, wherein the excluding comprises an action selected from the group consisting of removing the extended reality from a field of view of the user, repositioning the extended reality content to another portion in the field of view, and increasing the transparency of the extended reality content by a predetermined amount.

7. The method of claim 1, further comprising:
displaying the extended reality content in the field of view not associated with the at least one portion;
detecting, after the displaying, a change in the field of view to another field view;
identifying that the extended reality content is displayed on an excluded object in the another field view; and
automatically removing the extended reality content from the excluded object.

8. An information handling device, comprising:
a processor;
wherein the information handling device is operating within a vehicle;
a memory device that stores instructions executable by the processor to:
receive an indication to display extended reality content in a field of view;
identify whether at least one portion exists in the field of view where the extended reality content should not be displayed, wherein the identifying comprises:
determining a moving context associated with the vehicle;
identifying a real-world object present in the at least one portion;
accessing a database comprising a stored list of real-world objects, wherein each real-world object in the stored list contains a designation as being one of an excluded object or an included object, wherein the designation is influenced by the moving context; and
designating, based on the moving context and upon comparison of the identified real-world object to the accessed database, the real-world object as an excluded object or an included object; and
exclude, responsive to identifying that the real-world object is designated as an excluded object, the extended reality content from being displayed on the at least one portion in the field of view.

9. The information handling device of claim 8, wherein the extended reality content comprises content selected from the group consisting of augmented reality content, mixed reality content, and virtual reality content.

10. The information handling device of claim 8, wherein the information handling device is associated with at least one of: a head-mounted wearable device and a hand-held smart device.

11. The information handling device of claim 8, wherein the instructions executable by the processor to identify comprise instructions executable by the processor to identify prior to displaying the extended reality content.

12. The information handling device of claim 8, wherein the instructions executable by the processor to exclude comprise an action selected from the group consisting of removing the extended reality from a field of view of the user, repositioning the extended reality content to another portion in the field of view, and increasing the transparency of the extended reality content by a predetermined amount.

13. The information handling device of claim 8, wherein the instructions are further executable by the processor to:
display the extended reality content in the field of view not associated with the at least one portion;
detect, after the displaying, a change in the field of view to another field of view;
identify that the extended reality content is displayed on an excluded object in the another field of view; and
automatically remove the extended reality content from the excluded object.

14. A product, comprising:
a storage device that stores code, the code being executable by a processor and comprising:
code that receives an indication to display extended reality content in a field of view of an information handling device operating within a vehicle;
code that identifies whether at least one portion exists in the field of view where the extended reality content should not be displayed, wherein the identifying comprises:
determining a moving context associated with the vehicle;
identifying a real-world object present in the at least one portion;
accessing a database comprising a stored list of real-world objects, wherein each real-world object in the stored list contains a designation as being one of an excluded object or an included object, wherein the designation is influenced by the moving context; and
designating, based on the moving context and upon comparison of the identified real-world object to the accessed database, the real-world object as an excluded object or an included object; and
code that excludes, responsive to identifying that the real-world object is designated as an excluded object, the extended reality content from being displayed on the at least one portion in the field of view.

* * * * *